United States Patent [19]

Matkovits

[11] 4,239,033
[45] Dec. 16, 1980

[54] PARABOLIC REFLECTOR UNIT FOR SOLAR ENERGY COLLECTOR

[76] Inventor: Peter S. Matkovits, 17 W. Dale Ave., Glen Parva, Leicester, England

[21] Appl. No.: 942,795

[22] Filed: Sep. 15, 1978

[30] Foreign Application Priority Data

Sep. 22, 1977 [GB] United Kingdom .............. 39469/77

[51] Int. Cl.³ ............................. F24J 3/02; G02B 5/10
[52] U.S. Cl. ...................................... 126/438; 350/296
[58] Field of Search ...................... 350/292, 293, 296; 126/270, 271, 438

[56] References Cited

U.S. PATENT DOCUMENTS

| 3,974,824 | 8/1976 | Smith | 126/271 |
| 4,011,855 | 3/1977 | Eshelman | 126/271 X |
| 4,089,047 | 5/1978 | Luderitz | 126/271 X |
| 4,099,515 | 7/1978 | Schertz | 126/271 |
| 4,121,566 | 10/1978 | Radenkovic | 350/293 X |

Primary Examiner—F. L. Evans
Attorney, Agent, or Firm—Spensley, Horn, Jubas & Lubitz

[57] ABSTRACT

The invention relates to reflective means for use in solar energy utilizing apparatus and including reflective surfaces comprising two or more adjacent parallel troughs having inner surfaces with a reflective layer or coating, said troughs also having wall edge portions secured together to provide at least one inner wall and two outer walls, the cross-section of each trough being a portion of a parabola, said outer walls of end troughs following a longer portion of a parabola than the inner walls. Thus, the cross-sectional configuration of a twin trough arrangement resembles a letter "W".

12 Claims, 8 Drawing Figures

PARABOLIC REFLECTOR UNIT FOR SOLAR ENERGY COLLECTOR

BACKGROUND OF THE INVENTION

The present invention is concerned with improvements in or relating to reflective means, suitable for use in solar energy utilising apparatus.

The use of parabolic reflector units is known to assist in deflecting parallel rays to converge on a target area, but where the sun's rays are to be deflected, a change in the relative position of the sun and the reflective surface of the unit means that, unless elaborate mechanism for tracking the sun's progress is provided, the acceptance of rays by a reflector is limited to those times at which the sun is in a suitable position.

BRIEF SUMMARY OF THE INVENTION

The invention provides reflective means for use in solar energy utilising apparatus and including reflective surfaces comprising two or more adjacent parallel troughs having inner surfaces with a reflective layer or coating, said troughs also having wall edge portions secured together to provide at least one inner wall and two outer walls, the cross-section of each trough being a portion of a parabola, said outer walls of end troughs following a longer portion of a parabola than the inner walls.

In a twin trough arrangement, both troughs are end troughs, and a cross-sectional view of the arrangement resembles the letter "W". It may be found convenient if both outer walls are of the same height or one may follow a still longer portion of a parabola than the other outer wall. In a triple arrangement, the middle trough has two, short, inner walls.

The reflective means according to the invention may be used in conjunction with suitable types of energy absorbers, for example in a solar heating system using fluid-filled pipes as boilers, or in an electrical power producing arrangement in which photoelectric cells or the like are used.

The axes of symmetry of the troughs are preferably parallel, but may also be inclined so as to converge at a line spaced from the reflective surface.

In an example of the invention to be described below, a water heating system includes a hot water storage tank, and fluid circuit including a heat exchanger positioned in the storage tank. The fluid circuit may advantageously include means for alternatively connecting the boilers in parallel or in series.

BRIEF DESCRIPTION OF THE DRAWINGS

There will now be described examples of reflective means according to the invention. It will be understood that the description, which is to be read, with reference to the accompanying drawings is given by way of example.

In the accompanying drawings.

DETAILED DESCRIPTION OF THE DRAWINGS

Figure 1:
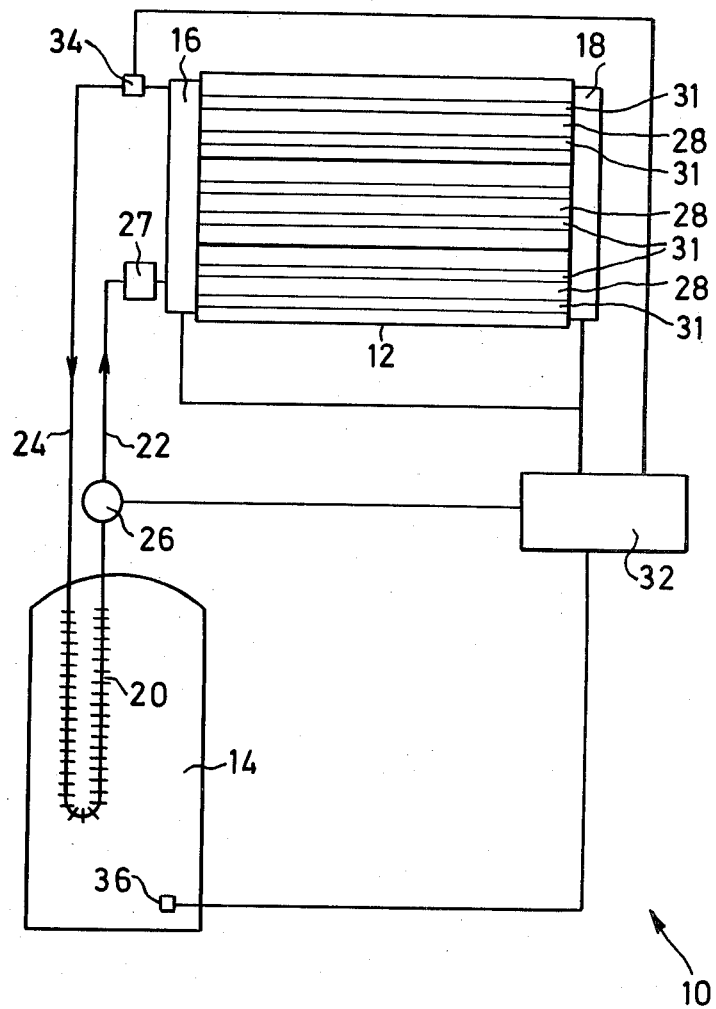
FIG. 1 is a diagram of a solar water-heating system embodying reflective means of the present invention.

Referring now to FIG. 1, there is shown a solar heating system 10 comprising a bank of reflector units 12, a hot water storage tank 14 provided with conventional inlets and outlets, not shown, and a fluid circuit including control valve storage units 16 and 18, a heat exchanger 20 positioned in the storage tank 14, pipes 22 and 24 connecting the valve unit 16 with the heat exchanger 20, a pump 26 for pumping water round the fluid circuit, and a thermostatically-controlled heat-release device 27, arranged to release excess heat from the system if necessary.

The bank of reflector units 12 comprises three reflector units 28 and, as will be described in more detail hereinafter, each reflector unit 28 is provided with a pair of boilers 31. The valve units 16 and 18 are arranged so as to connect the boilers 31 either in parallel or in series.

The heating system 10 is further provided with a control unit 32 which is connected to a temperature sensor 34 mounted in the outlet pipe of the reflector bank 12 and also to a temperature sensor 36 mounted in the storage tank. The control unit 32 provides control signals to the valve unit 16 and 18 and also to the pump 26.

In operation, water is driven round the fluid circuit so as to heat the water in the storage tank 14 with the valve units 16 and 18 and the pump 26 being controlled by the control unit 32 in accordance with the temperatures sensed by sensors 34 and 36.

As may be appreciated, when there is only a low rate of heating in the boilers 31, the boilers are arranged in series whereas when there is a high rate of heating the boilers are arranged in parallel.

Figure 2:
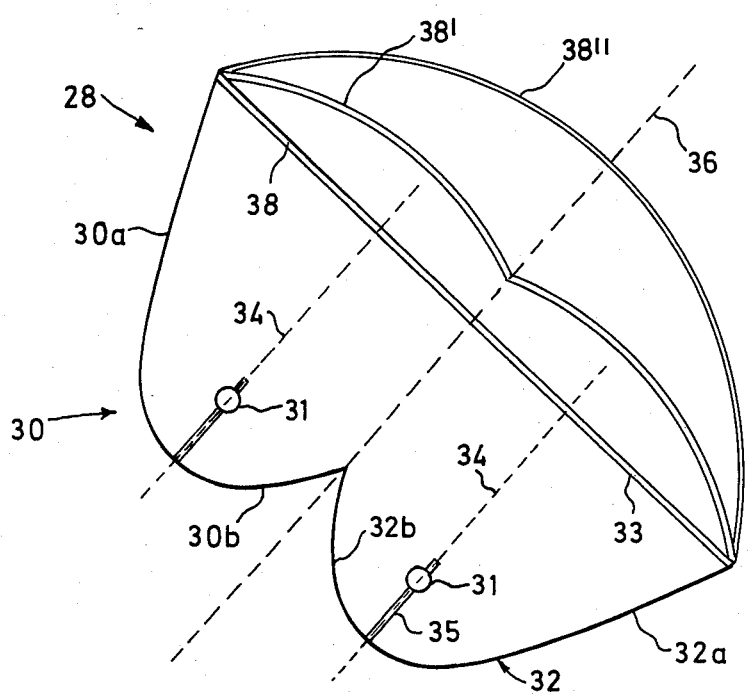
FIG. 2 is a cross-sectional view of one of the individual reflector units forming part of the system shown in FIG. 1.

Referring now to FIG. 2, there is shown one of the reflector units 28 in more detail. The reflector unit 28 comprises two individual parabolic cylindrical reflectors 30 and 32 arranged in a row of two with their longitudinal axes in parallel. The outer walls 30a and 32a of the reflectors are longer than the inner walls 30b and 32b and the axes of symmetry 34 and 36 are parallel. The boilers 31, which are hollow finned tubes and blackened on their exterior, are positioned at the focal points of the reflectors 30 and 32. A sheet of glass 38 extends between the outer sides 30a and 32a.

Alternative forms of curved glass covers are shown at 38' and 38'', to improve the reflection of infra-red radiation (the "greenhouse" effect).

The cover of the reflector unit serves to protect the reflective surface from atmospheric oxidation and from the elements of the weather and to reflect the infra-red radiation emitted by the energy absorbers.

The cover must allow transmission of visible light and the infra-red radiations from the outside to inside of the reflector, but be reflective to the longer wavelength (the infra-red) radiation emitted by the heat absorbers. This is achieved by the application of a thin layer of a suitably material 33 on the inside of the cover.

The reflectors 30 and 32 are formed from polyurethane foam and in order to provide a reflective surface, they are coated on their inner surface with aluminium foil. In an alternative embodiment PVC could be used and/or the reflectors coated with a vacuum deposited aluminium film or with gold plate. The tube of the boilers 31 of the present example are formed from copper and are blackened with a suitable black matt-coating. The tubes are mounted on heat-absorbent members 35 which lie in the axial plane of symmetry of each reflector.

In use, the reflector units 28 are arranged in a bank with a line normal to the longitudinal axes of the reflectors pointing towards the equator. Each reflector unit 28 is orientated so that the axis of symmetry 36 of the reflector 32 subtends a suitable angle with the horizontal. This angle will conveniently be the average angle of inclination of the sun at the relevant period of time.

Figure 3:
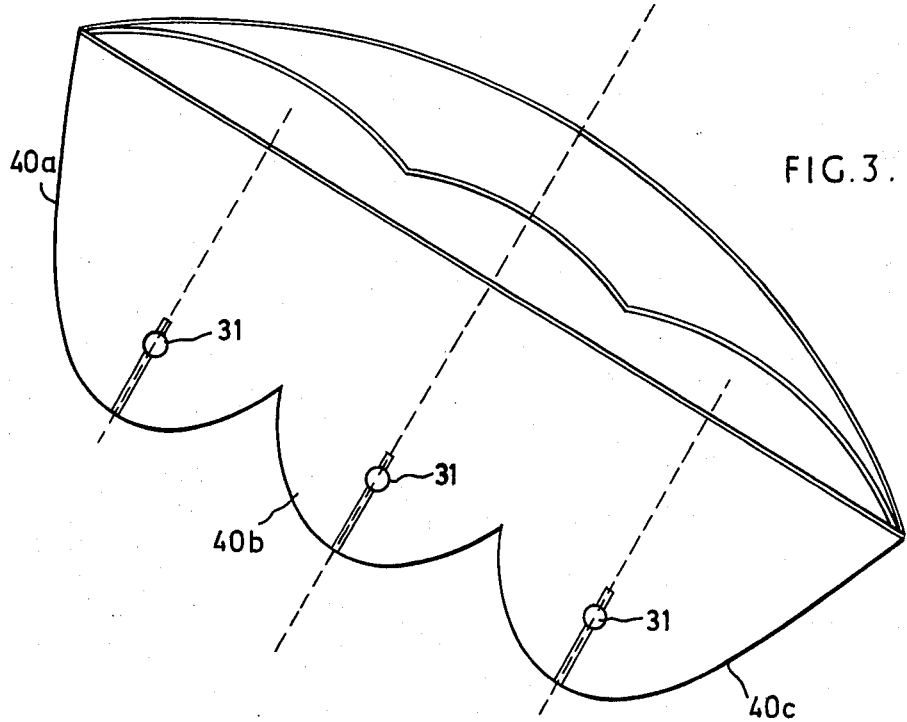
FIG. 3 is an alternative unit.

FIG. 2 shows an arrangement having two individual reflectors 30 and 32, but it is to be appreciated that more than two, for example three, individual reflectors 40*a*, *b* and *c* could be incorporated into each reflector unit as shown in a second example illustrated in FIG. 3.

Figure 4A:
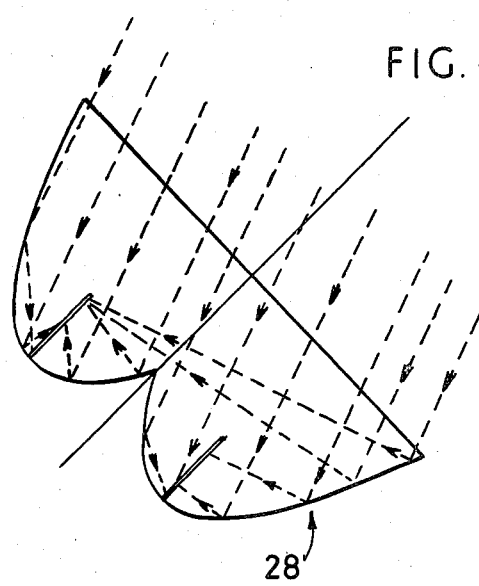
FIGS. 4a–c illustrate paths of reflectance occuring with changes in the sun's position.
Figure 4B:
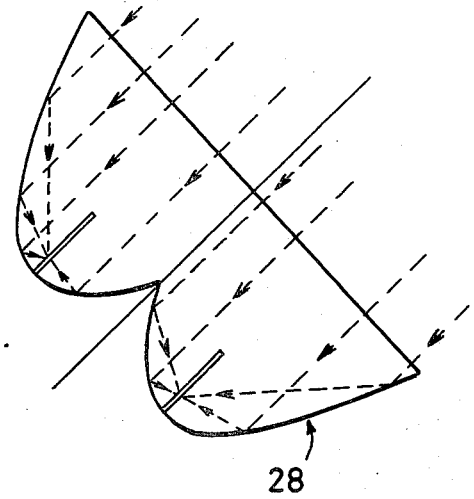
Figure 4C:
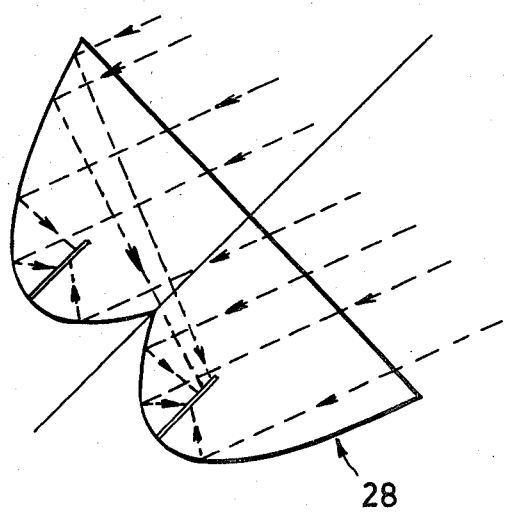

FIGS. 4*a* to 4*c* show three examples of paths of reflection of the sun's rays at various angles of inclination. FIG. 4*a* shows the paths when the solar altitude is greater than the average solar altitude, FIG. 4*b* shows the paths when the actual altitude is similar to the average, and FIG. 4*c* when it is less than the average.

Figure 5:
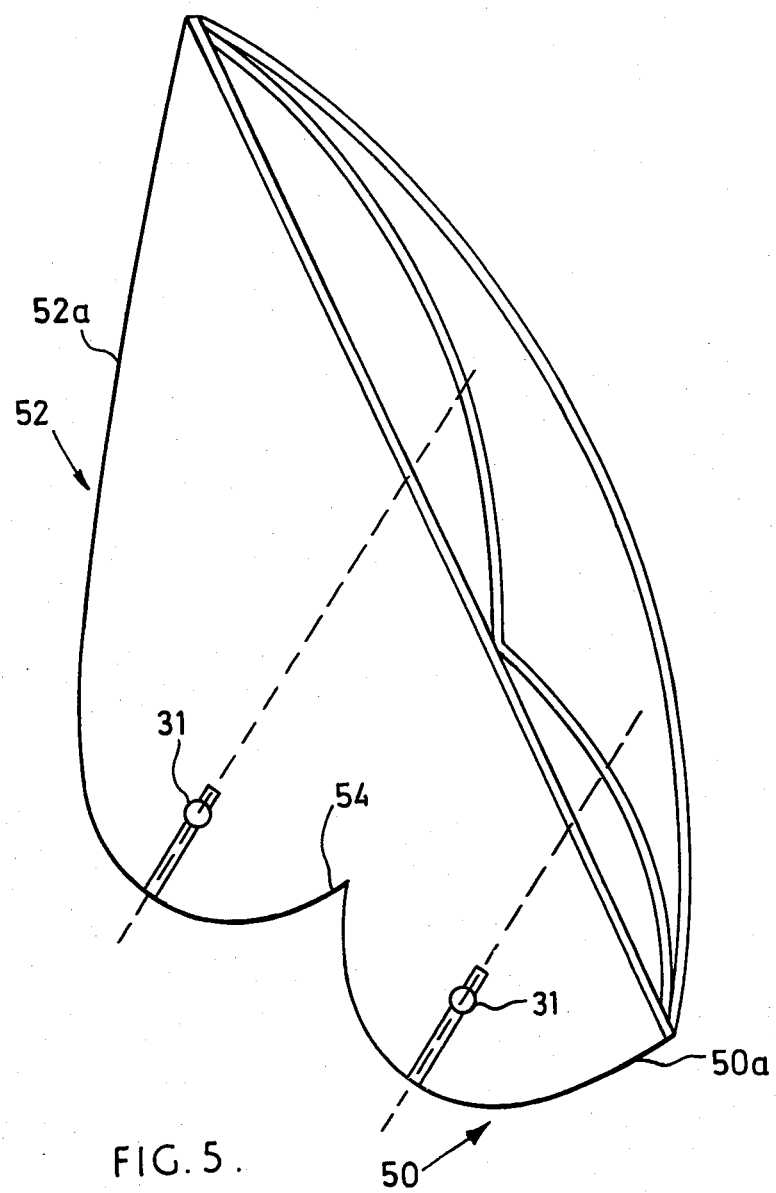
FIG. 5 illustrates a third alternative example of a reflector unit.

FIG. 5 shows a third example of a unit suitable for use with the invention. This unit comprises two reflectors 50 and 52, and it will be observed that the outer wall 52*a* of the reflector 52 extends upwardly further than the outer wall 50*a*, which itself extends further than the inner wall 54 in accordance with the invention. It has been found that this version is particularly useful in reflecting diffuse radiation such as is always present even in conditions where direct radiation is reduced. Since a flat plate-type of solar collector is the most efficient gather of diffuse radiation it will be appreciated that this alternative incorporates some of the flat plate-type of collector and therefore the efficiency of this alternative example for accepting diffused radiation is much greater. Since the efficiency of the acceptance of diffused radiation is the reciprocal of the concentration factor of the solar energy utilising apparatus, it may be seen that this example allows a balance to be struck which results in improved overall efficiency in mixed climatic conditions.

Although benefit may be derived from the use of the invention by selecting the relative dimensions of any of the reflector units by empirical methods it will be found that the efficiency of the apparatus, although impracticable to forecast quantitatively because of the number of variables involved, mainly related to geographical location, is improved if the following is observed.

Figure 6:
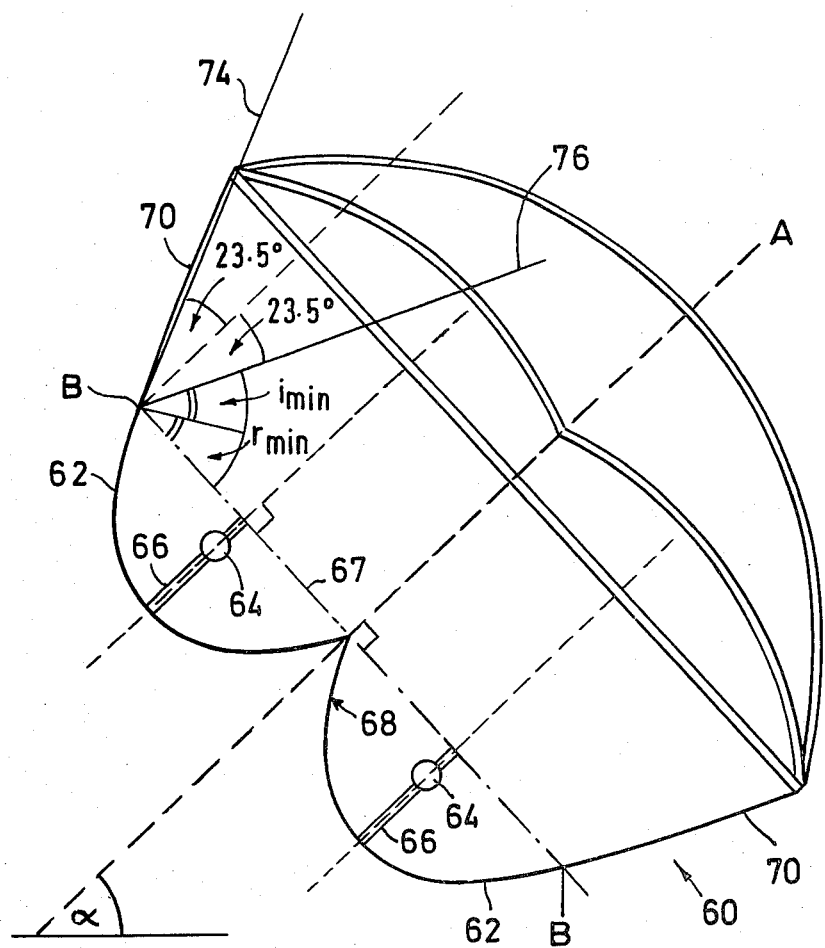
FIG. 6 is a similar view to FIG. 2.

Referring for example to FIG. 6, a reflector unit 60 is arranged so that its axis of symmetry A is at an inclined angle equal to the local angle of latitude. Each reflector 62 is provided with a boiler 64 mounted on a heat absorbent member 66 so that the boiler is at the line of focus of the parabolas, as before. The unit has an inner wall 68 of less height than outer walls 70. It is so arranged that an imaginary line 67 drawn from the top of the wall 68 at right angles to the axis of symmetry meets each outer wall 70 at a point B where a line 74 drawn outwardly to the lip of the outer wall 70 subtends an angle of $23\frac{1}{2}°$ with the axis of symmetry of each reflector. A second line 76 drawn at an angle of $23\frac{1}{2}°$ to the axis on its opposite side is the line along which the sun's rays will travel at their minimum angle of incidence, $i_{min}$, to be reflected along the line 67 ($i_{min}=r_{min}$). That is, the unit operates at maximum efficiency throughout the year whether the sun declination from 0° is $+23\frac{1}{2}°$ or $-23\frac{1}{2}°$ at the solstices.

The most efficient reflector unit according to the invention will therefore have cross-sectional dimensions (heights of walls and heat absorbing members) which satisfy the above indications.

I claim:

1. Reflective means for use in solar energy utilizing apparatus and including reflective surfaces, comprising two or more adjacent parallel troughs having inner surfaces with a reflective layer or coating, said troughs also having wall edge portions secured together to provide at least one inner wall and two outer walls, the cross section of each trough being a portion of a parabola, said outer walls of end troughs following a longer portion of a parabola than the inner walls, each said trough having a separate and distinct focal point.

2. Reflective means as claimed in claim 1, wherein there are two troughs, secured along adjacent wall edge portions to form a single inner wall which is shallower than the outer walls of the troughs.

3. Reflective means as claimed in claim 1, wherein there are two end troughs having outer walls deeper than their inner walls and at least one intervening trough having two walls of the same dimensions as said inner walls and secured therewith.

4. Reflective means as claimed in claim 1, wherein there is provided to cover said troughs at least one layer of material capable of transmitting visible and infra-red radiation, said layer(s) having an inner surface coated with material reflective to long wavelength infra-red radiation.

5. Reflective means as claimed in claim 4 wherein the layer is glass.

6. Reflective means as claimed in claim 1, wherein said one of said two outer walls follows a still longer portion of a parabola than the other of the two walls.

7. Reflective means as claimed in claim 1, wherein there is a provided means for being heated by the radiation reflected from said troughs comprising a plurality of tubes wherein each said tube is disposed along the axis which defines the focal point of each said trough.

8. Reflective means as claimed in claim 1, wherein there is provided separate, like absorbing means, each situated at the focal point of a reflective trough, for absorbing the radiation reflected from said trough.

9. Reflective means as claimed in claim 8, wherein each said absorbing means comprises a tube.

10. A parabolic reflector unit for incorporation in a solar energy utilization apparatus of the type having an elongated energy collection device, comprising:
first and second individual parabolic cylindrical reflectors mounted together with their longitudinal axes parallel, the wall of at least one of said first and second reflectors which is further from the other reflector being longer than the wall nearer the other reflector, the line of focus of each said first and second parabolic, cylindrical reflectors being situated on a respective opposite side of the axis of symmetry of said unit, a separate elongated energy collection device being mountable along each of said lines of focus.

11. A parabolic reflector unit according to claim 10 wherein each line of focus is situated within the trough of the respective reflector at a height less than the wall of that reflector nearer the other reflector.

12. A parabolic reflector unit according to claim 10 wherein there is provided means for mounting a separate elongated energy collection device along each of said lines of focus.

* * * * *